United States Patent [19]

Maas

[11] Patent Number: 5,513,179
[45] Date of Patent: Apr. 30, 1996

[54] PRIVATE BRANCH EXCHANGE AND LINE CARD TO BE USED IN SUCH A PRIVATE BRANCH EXCHANGE

[75] Inventor: René Maas, Amsterdam, Netherlands

[73] Assignee: U. S. Philips Corporation, New York, N.Y.

[21] Appl. No.: 263,105

[22] Filed: Jun. 21, 1994

[30] Foreign Application Priority Data

Jun. 21, 1993 [EP] European Pat. Off. ............. 93201796

[51] Int. Cl.$^6$ ................................................. H04L 12/02
[52] U.S. Cl. ...................... 370/58.2; 370/85.9; 370/108; 370/110.1; 379/166
[58] Field of Search .................................. 370/58.1, 58.2, 370/85.1, 85.6, 85.9, 108, 110.1; 379/90, 156, 165, 166, 225

[56] References Cited

U.S. PATENT DOCUMENTS

| | | | |
|---|---|---|---|
| 4,581,733 | 4/1986 | Sarson et al. ............................ | 370/67 |
| 4,985,887 | 1/1991 | Mizuhara et al. ....................... | 370/58.2 |
| 5,008,884 | 4/1991 | Yazawa et al. ......................... | 370/110.1 |
| 5,283,788 | 2/1994 | Morita et al. .......................... | 370/110.1 |
| 5,333,182 | 7/1994 | Aoki ...................................... | 379/156 X |

OTHER PUBLICATIONS

"ICS for Communications, ISDN Subscriber Access Controller", ISAC-S, Siemens Users Manual, (Entire Book), 1992.

Primary Examiner—Douglas W. Olms
Assistant Examiner—Russell Blum
Attorney, Agent, or Firm—Michael J. Balconi-Lamica; David Schreiber

[57] ABSTRACT

A line card (1) in a private branch exchange (1) accommodates interfaces (1) which switch standard output frames on a system bus. These standard output frames contain control data in addition to subscriber data. As a result, the system frame of the system bus (SB) is not filled efficiently. By switching only the subscriber data from the standard output frames to the system bus by the switching means, the system frame is filled efficiently.

10 Claims, 4 Drawing Sheets

PRIVATE BRANCH EXCHANGE AND LINE CARD TO BE USED IN SUCH A PRIVATE BRANCH EXCHANGE

BACKGROUND OF THE INVENTION

1. Field of the Invention

The invention relates to a private branch exchange comprising a line card, which card includes a plurality of interfaces for accommodating data from incoming subscriber lines in standard output frames, these frames comprising subscriber data and control data.

The invention further relates to a line card to be used in such a private branch exchange.

2. Discussion of the Related Art

A known interface to be used on a line card in a private branch exchange is the ISAC®-S interface from Siemens. A manual in which this interface is described is called "ICs for Communications, ISDN Subscriber Access Controller, ISAC®-S, PEB 2085". This manual will further be referred to as ISAC®-S manual. The ISAC®-S inserts data of incoming subscriber lines into standard output frames which are further filled up with control data. These standard output frames are switched to a system bus, the so-called IOM®02 bus. This bus conveys these data to other system components present on the line card. The IOM®-2 bus has a standard system frame comprising 8 channels accommodating each exactly one standard output frame of an ISAC®-S interface. By programming the ISAC®-S interfaces there may be determined which channel is assigned to which interface. The standard output frames comprise data which cannot be used in certain types of private branch exchanges and are thus redundant. This means that the frame is not filled efficiently. Each IOM®-2 bus is basically only suitable for processing the data coming from 8 interfaces.

SUMMARY OF THE INVENTION

It is an object of the invention to provide a private branch exchange of the type defined in the opening paragraph in which an efficient filling of the system frame is obtained.

A private branch exchange according to the invention is characterized in that the line card comprises switching means arranged for switching only the subscriber data from the standard output frames in a system frame to a system bus. This achieves that the control data not used in other system components available on the line card do not end up on the system bus. In lieu of these control data only subscriber data are switched to the system bus. This means that more interfaces can be connected to an IOM®-2 bus in a private branch exchange according to the invention than to an IOM®-2 bus used in prior-art manner.

An embodiment for a private branch exchange according to the invention is characterized in that the interfaces are divided into a first group and a second group while the switching means, at least partly distributed over the interfaces, are arranged for switching in turns the standard output frames of the first group to a first data bus and, in a delayed manner, the standard output frames of the second group to a second data bus, and for switching only the subscriber data on the first data bus and on the second data bus to the system bus. As a result, there may be effected that the system frame is filled efficiently without the need for much additional hardware and without significantly adjusting the programming of the interfaces.

A further embodiment for a private branch exchange according to the invention is characterized in that the switching means are arranged for switching the first group in response to a frame synchronization signal and for switching the second group in response to the frame synchronization signal delayed by a delay line. This achieves a simple system switching the second group in a delayed manner.

A further embodiment for a private branch exchange according to the invention is characterized in that the switching means are arranged for switching the first group in response to the frame synchronization signal and for switching the second group in response to a switching signal that can be produced by the first group and is used as a frame synchronization signal, which switching signal denotes that there are subscriber data present on the first data bus. As a result, the second group can be switched in a delayed manner relative to the first group without the use of a delay line, so that less external hardware is necessary, whereas the system is not affected by inaccuracies in the delay line either.

A further embodiment for a private branch exchange according to the invention is characterized in that the switching means which are at least partly distributed over the interfaces contain switching signals that can be produced by the interfaces, which signals denote when subscriber data are available, while the interfaces are combined in series and the switching signals are switched to successive synchronization inputs of the interfaces, and the switching means further include gates coupled to the interfaces and having first inputs for receiving switching signals and second inputs for receiving the standard output frames for selectively switching subscriber data through to the system bus. This provides a system that efficiently fills up the system frame without utilizing additional data buses and uses cost-effective logic gates in lieu of an external switch.

A further embodiment for a private branch exchange according to the invention is characterized in that the line card comprises a microcontroller for converting at least part of the control data of the interfaces into internal messages, which microcontroller is arranged for switching the internal messages to the system bus. As a result, there is a possibility of transferring these internal messages to the other system components present on the line card without the use of additional data buses.

BRIEF DESCRIPTION OF THE DRAWINGS

The invention will be further explained with reference to a drawing in which.

DETAILED DESCRIPTION OF THE PREFERRED EMBODIMENTS

Figure 1:
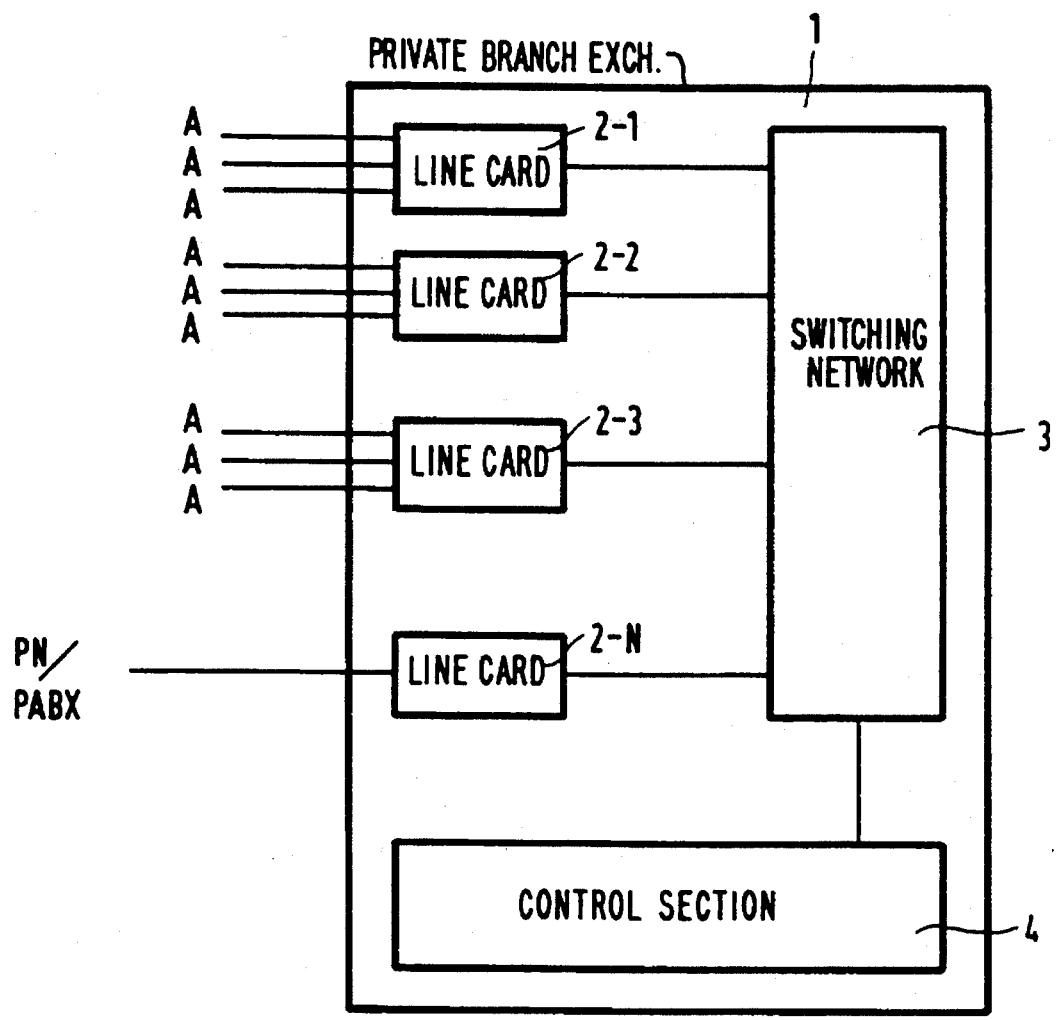
FIG. 1 shows a simplified block circuit diagram of a private branch exchange.

FIG. 1 shows a simplified block circuit diagram of a private branch exchange 1. The private branch exchange comprises a plurality of line cards 2-1 . . . 2-N which may be connected both to subscriber lines A and to the public telephone network PN or to another private branch exchange PABX. Such line cards 2 form the interface between incoming and outgoing lines and a switching network 3. The switching network provides proper mutual switching of the subscriber lines and switching between the subscriber lines and the public telephone network. A control section 4 is used, for example, for controlling the switching network.

Figure 2:
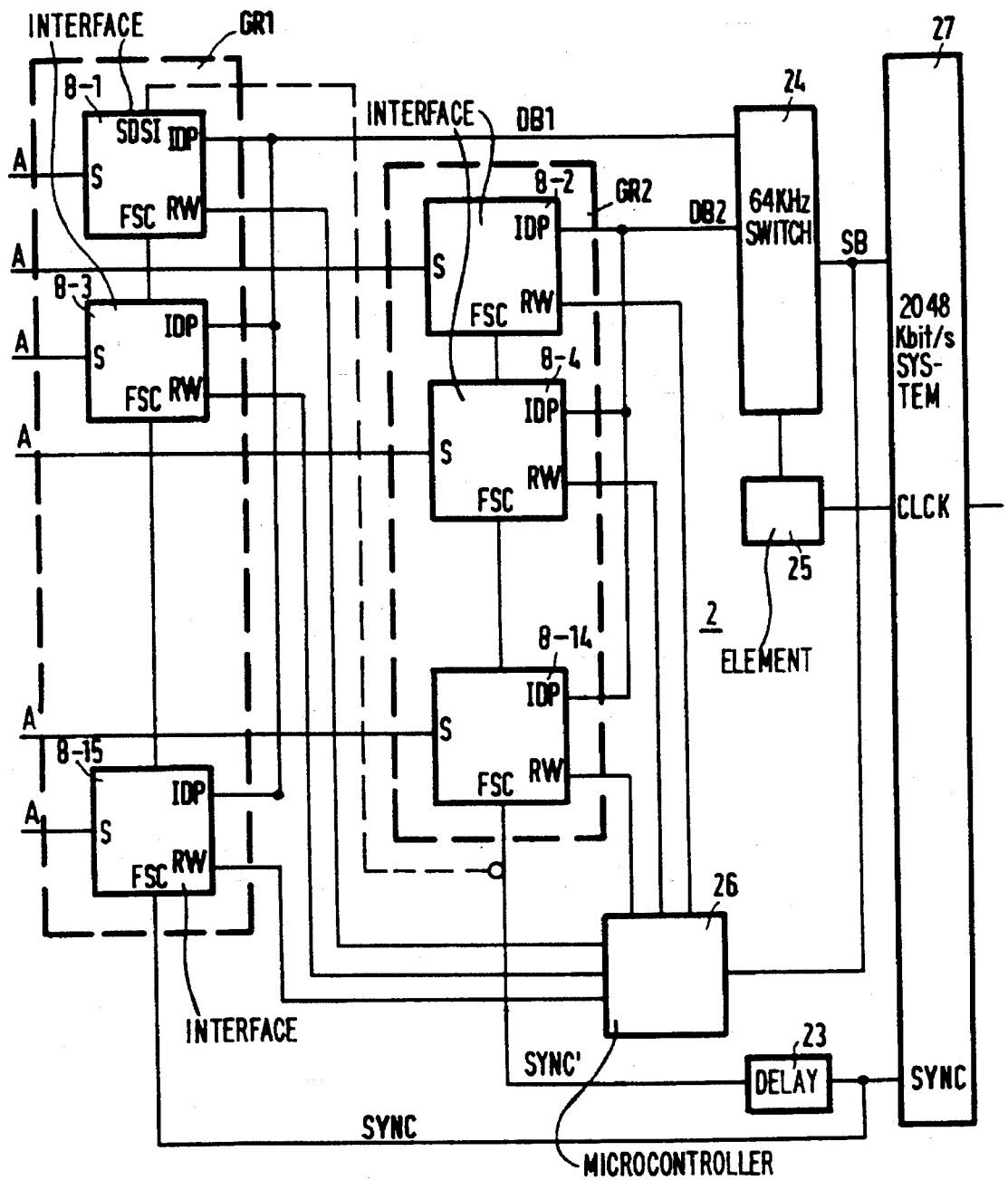
FIG. 2 shows a line card on which the interfaces are divided into two groups.
Figure 3:
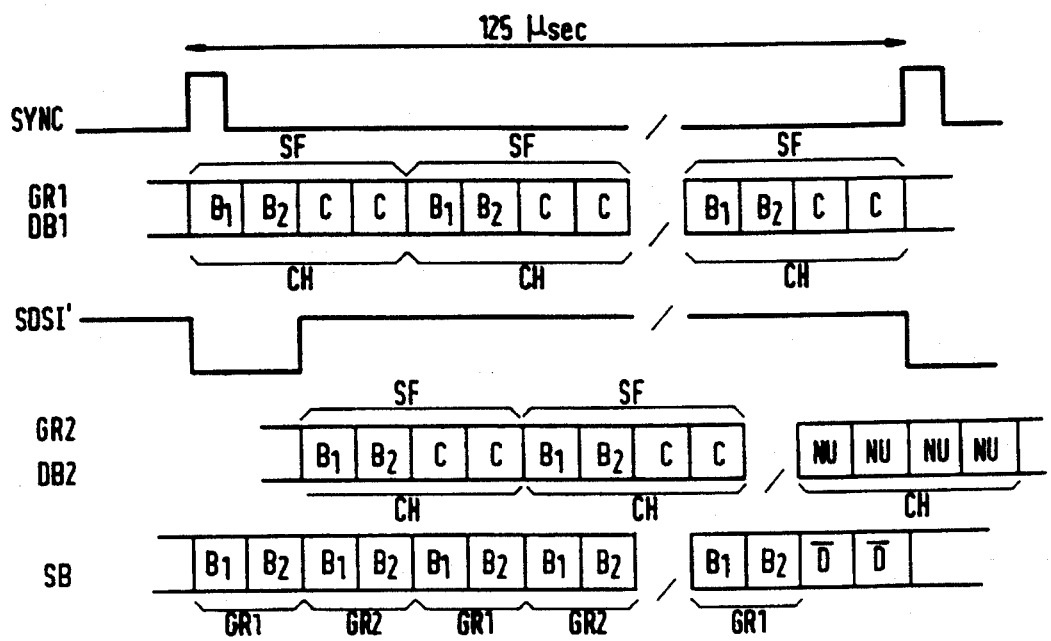
FIG. 3 shows a system frame of the embodiment shown in FIG. 2, representing what data are present in this frame.

FIG. 2 shows a line card 2 in which the interfaces 8 are divided into two groups GR1 and GR2. Group 1 comprises 8 interfaces and group 2 comprises 7 interfaces. Each interface is supplied with data from subscriber lines A. If standard ISDN equipment is connected to such a subscriber line, the interface receives 2 B-channels channels B1 and B2 and 1 D-channel D on its S-input. These data are accommodated in a standard output frame SF by the interfaces. Further control data are added to this standard output frame. Such a standard output frame comprises 4 bytes: 1 byte for each B-channel and 2 bytes for the control data C which comprise the data of the D-channel. The exact structure of such a standard output frame is shown in said manual of ISAC®—S on page 49. The two groups of interfaces write their standard output frames on data buses DB1 and DB2 through a gate IDP having a bit rate of 2048 kbit/s. These data buses both have a frame comprising 8 CH-channels of 4 bytes. In each channel the standard output frame of an interface is accommodated. By suitably programming an ADF1-register of the ISAC®-S (ISAC®-S manual page 202), a channel is assigned to each interface. For its timing each interface receives a frame synchronization signal on the input FSC. The first group receives the frame synchronization signal SYNC which is directly supplied by a 2048 kbit/s system 27. The second group receives the frame synchronization signal SYNC' which is delayed by 2 bytes over a delay line 23. Furthermore, each interface receives a 4096 kHz clock signal (not shown here) (cf. ISAC®-S manual). The frame structure of the data buses DB1 and DB2 is shown in FIG. 3. It is evident that the subscriber data, that is, the B-channels B1 and B2 of the two groups, are exactly side by side seen with respect to time. By switching the data bus subscriber data to a system bus SB by a 64-kHz switch 24, there is achieved that there are only subscriber data in the system frame on the system bus. This system bus conveys the data for further processing to further system components present on the line card which are shown here as the 2048 kbit/s system 27. With respect to the embodiment shown in FIG. 2 there should be observed that the data between the interfaces and the 2048 kbit/s system are exchanged in the full duplex mode. The ISAC®-S is designed for simultaneously reading and writing data on a bus. To this end, the ISAC®-S has 2 ports (IDP0 and IDP1). Since the invention may be explained best with reference to a situation in which data are written to a bus, only a single port IDP is shown. Further details may be found in said manual. The switch 24 is coupled to an element 25 which generates a 64-kHz clock. The switch may be simply realized by a person of ordinary skill in the art by means of standard multiplexers and demultiplexers. They are described in §11.3 of "Logic Design Principles: with emphasis on testable semicustom circuits" by Edward J. McCluskey, Prentice Hall International 1986.

The second group may also be switched in a delayed manner by applying a signal SDS1 (page 13 ISAC®-S manual) that can be produced by the first group of interfaces to the FSC inputs of the interfaces of the second group. The signal SDS1 may be programmed such that it is high if the B-channels of the standard output frame are present on the data bus and low during the rest of the frame. By using the inverted SDS1 signal SDS1' coming from the first interface 8-1 of the first group for this purpose, the same effect is achieved as with the delay line. The rising edge of the signal SDS1' is used for the purpose of synchronization. The inverted signal SDS1' used in this embodiment is shown in FIG. 3.

For converting the D-channels, which cannot be processed in a certain type of exchange, into internal messages suitable for this type of exchange, each interface is coupled to a microcontroller 26 via a read/write port RW. This microcontroller converts these data into internal messages which it then switches to the output bus at a certain position in the system frame. In FIG. 3 is shown that the last 2 bytes of the system frame are filled with converted $\overline{\text{D}}$-channels. Needless to observe that different bytes in the system frame can also be filled with these data. The number of interfaces in the groups GR1 and GR2 and the assignment of the channels in which they are allowed to accommodate their standard output frames are then to be taken into account.

Figure 5:
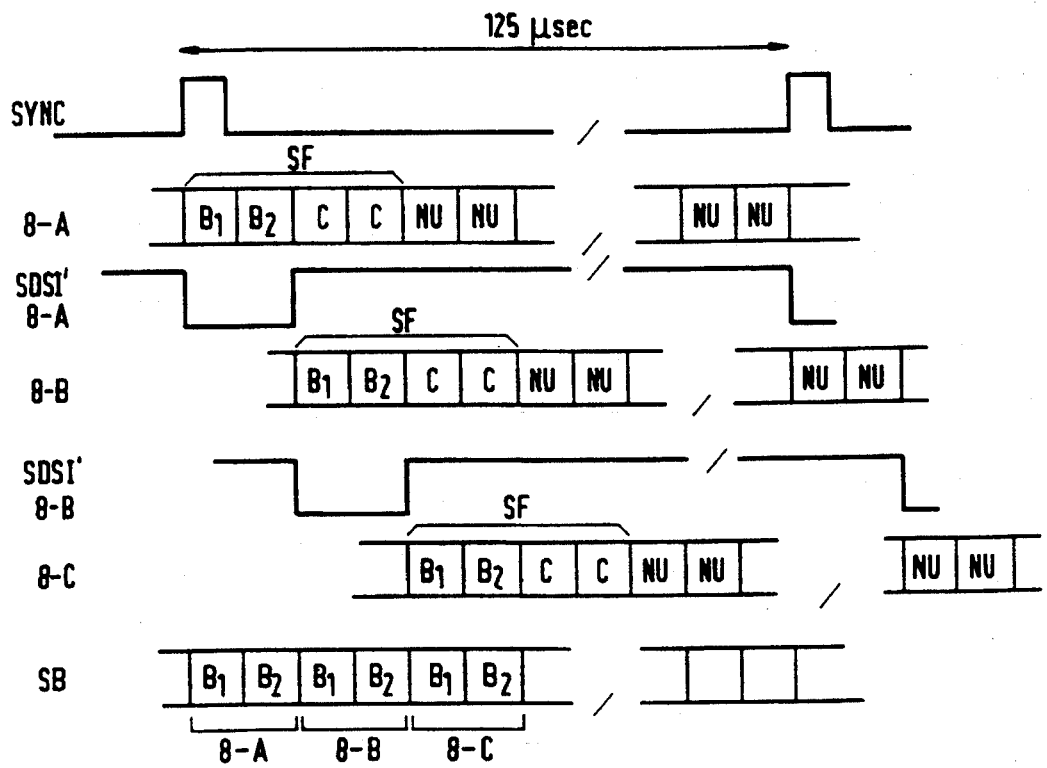
FIG. 5 shows a system frame of the embodiment shown in FIG. 4A.
Figures 4A, 4B:
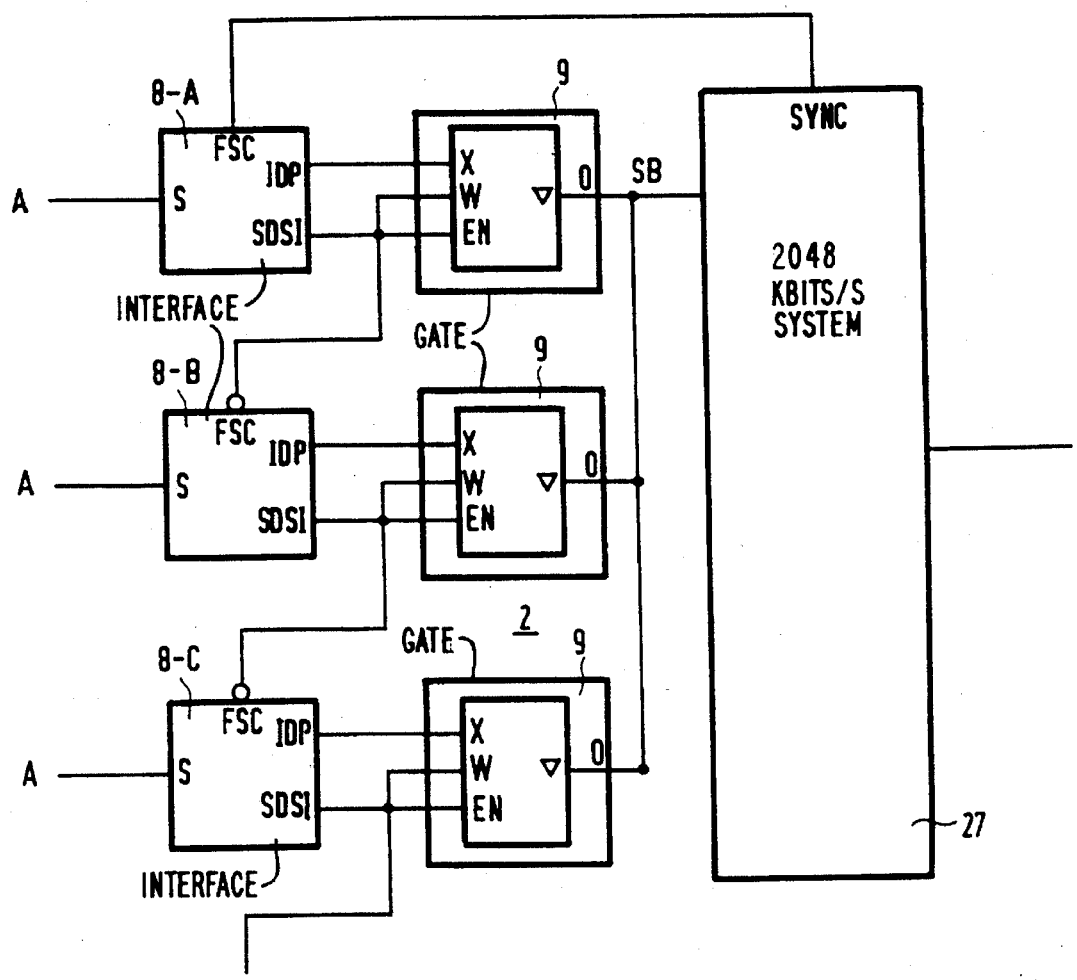
FIG. 4A shows a line card in which the interfaces are coupled in series.
FIG. 4B shows a logic table of the logic gate shown in FIG. 4A.

FIG. 4A shows a further embodiment of the invention. Herein the interfaces are combined in series. The first interface 8-A is supplied with a frame synchronization signal SYNC of the 2048 kbit/s system. The interface is programmed so that it writes its standard output frame in the first channel, thus just after the rising edge of the synchronization pulse. This is shown in FIG. 5. Parts in the frame that are not used are designated NU. The inverted SDS1 signal SDS1' of the interface 8-A is applied to interface 8-B. This signal denotes when subscriber data (thus B-channels) of interface 8-A are present on the system bus. By utilizing this signal as a synchronization pulse and programming the ADF1-register of interface 8-B, so that also this interface writes the standard output frame in the first channel, this interface generates its standard output frame 2 bytes later than interface 8-A. By applying the inverted SDS1 signal SDS1' of interface 8-B to a next interface 8-C, a similar effect can be achieved. This way of switching may naturally be continued. To have only the subscriber data of the interfaces on the system bus, use is made of a logic gate 9. The logic table of the gate is shown in FIG. 4B. If the data of the standard output frame are present on input C and the signal SDS1 on input D, only the subscriber data are switched to the system bus. The logic gate is enabled if the signal on the enable input is high, so that the signal SDS1 can also be used as an enable signal. In FIG. 5 are shown the frames of the three interfaces as well as the system frame on the system bus, as they are obtained in the embodiment shown in FIG. 4. Needless to observe that the system frame may be filled further by including more interfaces in the series combination.

What is claimed is:

1. A private branch exchange comprising:
   a line card including a plurality of interfaces for accommodating data from incoming subscriber lines in standard output frames, said frames comprising subscriber data and control data, said interfaces being divided into a first group and a second group,
   wherein said line card further comprises switching means, at least partly distributed over said interfaces, for switching in turns the standard output frames of the first group to a first data bus and the standard output frames of the second group to a second data bus, such that when the control data are present on the first data bus, subscriber data are present on the second data bus and when control data are present on the second data bus, subscriber data are present on the first data bus, wherein said switching means is further for switching only the subscriber data on the first data bus and on the second data bus to an external system bus.

2. A private branch exchange as claimed in claim 1, wherein said line card further comprises a microcontroller for converting at least part of the control data of the interfaces into an internal message, said microcontroller for switching the internal messages to the system bus.

3. A private branch exchange as claimed in claim 1, wherein said switching means is arranged for switching the first group in response to a frame synchronization signal and for switching the second group in response to the frame synchronization signal delayed by a delay line.

4. A private branch exchange as claimed in claim 3, wherein said line card further comprises a microcontroller for converting at least part of the control data of the interfaces into an internal message, said microcontroller for switching the internal messages to the system bus.

5. A private branch exchange as claimed in claim 1, wherein said switching means is arranged for switching the first group in response to a frame synchronization signal and for switching the second group in response to a switching signal produced by said first group and used as a frame synchronization signal, said switching signal denoting that there are subscriber data present on the first data bus.

6. A private branch exchange as claimed in claim 5, wherein said line card further comprises a microcontroller for converting at least part of the control data of the interfaces into an internal message, said microcontroller for switching the internal messages to the system bus.

7. A private branch exchange comprising:

a line card including a plurality of interfaces for accommodating data from incoming subscriber lines in standard output frames, said frames comprising subscriber data and control data, the line card further comprising switching means which is partly distributed over the interfaces, the switching means containing switching signals produced by the interfaces, said signals denoting when subscriber data are available, while the interfaces are combined in series and the switching signals are switched to successive synchronization inputs of the interfaces, wherein the switching means further includes gates coupled to the interfaces and having first inputs for receiving switching signals and second inputs for receiving the standard output frames for selectively switching subscriber data through to an external system bus.

8. A private branch exchange as claimed in claim 7, wherein said line card further comprises a microcontroller for converting at least part of the control data of the interfaces into an internal message, said microcontroller for switching the internal messages to the system bus.

9. A line card for use in a private branch exchange, comprising:

a plurality of interfaces for accommodating data from incoming subscriber lines in standard output frames, said frames comprising subscriber data and control data, said interfaces being divided into a first group and a second group, switching means, at least partly distributed over said interfaces, for switching in turns the standard output frames of the first group to a first data bus and the standard output frames of the second group to a second data bus, such that when the control data are present on the first data bus, subscriber data are present on the second data bus and when control data are present on the second data bus, subscriber data are present on the first data bus, wherein said switching means is further for switching only the subscriber data on the first data bus and on the second data bus to an external system bus.

10. A line card as claimed in claim 9, further comprising a microcontroller for converting at least part of the control data of the interfaces into an internal message, said microcontroller for switching the internal messages to the system bus.

\* \* \* \* \*